United States Patent
Wenzel et al.

(10) Patent No.: US 10,493,665 B2
(45) Date of Patent: Dec. 3, 2019

(54) METHOD FOR PRODUCING A PROFILE SEGMENT OF A SEGMENTED CASTING-VULCANIZING MOLD FOR VEHICLE TIRES AND A VULCANIZING MOLD AND A VEHICLE TIRE

(71) Applicant: Continental Reifen Deutschland GmbH, Hannover (DE)

(72) Inventors: Karsten Wenzel, Helpsen (DE); Magnus Hasselloef, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 367 days.

(21) Appl. No.: 15/684,593

(22) Filed: Aug. 23, 2017

(65) Prior Publication Data

US 2017/0348877 A1 Dec. 7, 2017

Related U.S. Application Data

(63) Continuation of application No. PCT/EP2015/078748, filed on Dec. 7, 2015.

(30) Foreign Application Priority Data

Feb. 23, 2015 (DE) .................. 10 2015 203 212

(51) Int. Cl.
| | |
|---|---|
| *B22C 7/00* | (2006.01) |
| *B22C 9/10* | (2006.01) |
| *B29C 33/56* | (2006.01) |
| *B29D 30/06* | (2006.01) |
| *B29C 33/38* | (2006.01) |
| *C23C 4/134* | (2016.01) |

(52) U.S. Cl.
CPC ............ *B29C 33/56* (2013.01); *B22C 7/005* (2013.01); *B22C 9/10* (2013.01); *B29C 33/3842* (2013.01); *B29C 33/3892* (2013.01); *B29D 30/0606* (2013.01); *B29D 2030/0616* (2013.01); *C23C 4/134* (2016.01)

(58) Field of Classification Search
CPC .. B22C 7/00; B22C 7/005; B22C 9/10; C23C 4/134; B29C 33/3842; B29C 33/3857; B29C 33/3878; B29C 33/3885; B29C 33/3892; B29C 33/56; B29D 30/06; B29D 30/0606; B29D 2030/0616
USPC .................................. 164/6, 15, 17, 45, 159
See application file for complete search history.

(56) References Cited

U.S. PATENT DOCUMENTS

| | | | |
|---|---|---|---|
| 5,431,873 A | 7/1995 | Vandenberghe | |
| 5,449,483 A | 9/1995 | Greenwood et al. | |
| 7,402,031 B2 | 7/2008 | Hyakutake et al. | |
| 9,238,309 B2 | 1/2016 | King et al. | |
| 2009/0162465 A1* | 6/2009 | Komornik | B22F 3/1109 |
| | | | 425/47 |
| 2010/0282387 A1 | 11/2010 | Wenzel | |
| 2014/0087067 A1 | 3/2014 | Siffer et al. | |

FOREIGN PATENT DOCUMENTS

| | | |
|---|---|---|
| JP | H0274404 A | 3/1990 |
| JP | 2001150444 A | 6/2001 |
| RU | 2340458 C2 | 12/2008 |

OTHER PUBLICATIONS

International Search Report dated Feb. 9, 2016 of international application PCT/EP2015/078748 on which this application is based.

\* cited by examiner

*Primary Examiner* — Kevin P Kerns
(74) *Attorney, Agent, or Firm* — David L. Cate; Gregory Adams

(57) ABSTRACT

A method is for producing a profile segment of a segmented casting-vulcanizing mold for vehicle tires, the molding area of which molds a segment of the tread profile of a tire to be vulcanized, including the steps: creating a rigid model segment having a casing-like tread surface; milling the profile positive of the tread into the casing-like tread surface of the model segment to obtain the master model; creating a flexible impression from the master model; creating a rigid plaster cast from the impression to form a casting core segment; casting all of the annular, placed-together casting core segments with an aluminium-magnesium alloy to obtain a vulcanizing mold, subsequently divided into profile segments. A plasma coating is applied to the tread of the model segment, into which the profile positive of the tread is subsequently milled to obtain the master model. Plasma coating gives the master model a defined roughness.

6 Claims, No Drawings

METHOD FOR PRODUCING A PROFILE SEGMENT OF A SEGMENTED CASTING-VULCANIZING MOLD FOR VEHICLE TIRES AND A VULCANIZING MOLD AND A VEHICLE TIRE

CROSS REFERENCE TO RELATED APPLICATIONS

This application is a continuation application of international patent application PCT/EP2015/078748, filed Dec. 7, 2015, designating the United States and claiming priority from German application 10 2015 203 212.4, filed Feb. 23, 2015, and the entire content of both applications is incorporated herein by reference.

FIELD OF THE INVENTION

The invention relates to a method for manufacturing a profile segment of a segmented vulcanizing mold for vehicle tires, the molding area of which forms a segment of the tread profile of a tire to be vulcanized, including the following steps:
- producing a rigid model segment which has a casing-shaped tread surface;
- milling the profile positive of the tread into the casing-shaped tread surface of the model segment in order to obtain the master model;
- producing a flexible imprint preferably made of silicone rubber from the master model;
- producing a rigid casting made of plaster from the imprint preferably made of silicone rubber in order to form a casting core segment; and,
- casting all the annular casting core segments placed one against the other with an aluminum-magnesium alloy in order to obtain a vulcanizing mold which is in turn subsequently divided into individual profile segments.

The invention also relates to a vulcanizing mold and a vehicle tire.

BACKGROUND OF THE INVENTION

Vulcanizing molds for tires are composed, inter alia, of molded parts which together form the radially outer surface of the tire such as the tread, the shoulder region, the sidewalls and the bead region. The segments which form the tread are referred to as profile segments or molded segments.

The term "profile positive" comprises all the sipes of the profile as well as possible further sipes such as those for the insertion of lamellar plates for passenger cars and van tires.

The mold segments of vulcanizing molds for tires are fabricated from aluminum and metal. A person skilled in the art is sufficiently familiar with vulcanizing molds manufactured by casting methods and with the method described above for obtaining a casting mold.

The non-vulcanized green tire blank is vulcanized in the vulcanizing mold and transferred into its ultimate rubber-elastic state by rubber crosslinking reactions. In the process, the tire is given its profile configuration by the corresponding negative configuration of the molding areas of the mold segments. The term molding areas refers to those areas of the mold segments that give the tire blank its corresponding configuration.

It is advantageous for the tire performance, in particular for the snow and ice performance of winter tires, if the casing-shaped surface of the tire tread has a defined degree of roughness. The grooves of the tread profile which bound the raised profile elements should, on the other hand, be as "smooth" as possible in order to give the tire an impression of high quality.

United States patent application publication 2010/0282387 discloses that the molding areas of the profile segments of the vulcanizing mold have a plasma coating with a defined degree of roughness. The tire tread which is vulcanized with this vulcanizing mold also has, owing to the imprint of the plasma coating, a defined degree of roughness and performance which is improved thereby. A suitable plasma coating and the advantages which can be achieved therewith are described in the abovementioned document.

However, it is costly to provide every completely manufactured vulcanizing mold subsequently with a suitable plasma coating; in particular, if the raised webs of the molding area which mold the grooves of the tire tread are not to be provided with the plasma coating which has the degree of roughness.

SUMMARY OF THE INVENTION

An object of the invention is therefore to make available a simple and cost-effective method for manufacturing a profile segment of a segmented casting-vulcanizing mold for vehicle tires with which the casing-shaped tread surface of a tire to be vulcanized is provided with a defined degree of roughness, while the webs which stamp the grooves into the tire tread are to be made "smooth".

This object is achieved by the fact that a plasma coating is applied to the tread of the model segment, into which the profile positive of the tread is subsequently milled in order to obtain the master model, wherein the plasma coating is configured in such a way that it gives the master model a certain degree of roughness.

This method is cost-effective and simple. The master model receives the roughness which is transferred to the ultimate vulcanizing mold by the further known imprinting and casting method steps. Any desired number of castings made of plaster to obtain the casting core can be obtained from the flexible imprint which is preferably made of silicone rubber. Therefore, a plasma coating with defined roughness has to be applied only once, from which a large number of profile segments with a rough tread surface can be obtained. Since the profile is not milled into the model segment until after the plasma coating has been applied thereto, the subsequently milled grooves and other recesses are not provided with the plasma coating but are instead "smooth". It is to be borne in mind that the imprinting and casting methods reduce the depth of the roughness of the master model down to the vulcanized tire. Therefore, the roughness of the master model is to be selected such that the desired final roughness can be obtained on the vulcanized tire.

The term "smooth" means a degree of roughness with a depth of roughness≤3 µm, measured on the new vulcanized tire which is vulcanized with a vulcanizing mold manufactured according to the method according to the invention.

DESCRIPTION OF THE PREFERRED EMBODIMENTS OF THE INVENTION

It has become apparent that the best results with respect to the performance of the new vehicle tire which is vulcanized with the vulcanizing mold, in particular the snow performance and ice performance of winter tires, are obtained on the vulcanized vehicle tire in the new state by a degree of roughness with a surface profile of 5-50 μm, preferably of 7.5-25 μm, and particularly preferably of 10-15 μm.

It is advantageous if the plasma coating is applied to the model by application of a thermal sprayed layer. This method is particularly suitable for coating the surface of the model and therefore for applying a defined degree of roughness to the surface profile segment which is cast in further method steps. It is advantageous if the thermal sprayed layer is composed of a matrix and of spray additives which are distributed statistically in this matrix, wherein the spray additives determine the degree of roughness. The spray additives can be granules which can be selected, for example, with respect to their granule size, their structure, their external granular shape and their hardness corresponding to the properties desired for the sprayed layer. A possible way is provided of adjusting the desired degree of roughness by selecting a suitable thermal sprayed layer, in particular by the selection of the spraying additives.

In addition, the matrix substance can also be selected in accordance with the desired properties.

Therefore, the properties of the thermal sprayed layer can be influenced by selectable parameters of the matrix and/or of the spraying additives, with the result that the roughness structure of the sprayed layer can be adjusted.

The invention also relates to a vulcanizing mold which is manufactured according to the above-mentioned method, and to a vehicle tire which is vulcanized with an above-mentioned vulcanizing mold.

The vehicle tire is preferably a passenger car tire, van tire or motorcycle tire, wherein the passenger car tire is preferably a winter tire.

It is understood that the foregoing description is that of the preferred embodiments of the invention and that various changes and modifications may be made thereto without departing from the spirit and scope of the invention as defined in the appended claims.

What is claimed is:

1. A method of manufacturing a profile segment of a segmented casting-vulcanizing mold for vehicle tires, wherein the profile segment comprises a molding area that forms a segment of a tread profile of a tire to be vulcanized, which comprises:
   producing a rigid model segment comprising a casing-shaped tread surface, wherein the casing-shaped tread surface comprises a profile positive of the tread profile;
   coating the rigid model segment with a plasma coating;
   milling the profile positive of the tread into the casing-shaped tread surface of the rigid model segment to obtain a master model;
   producing a flexible imprint from the master model;
   producing a rigid casting made of plaster from the flexible imprint to form a casting core segment; and
   casting all casting core segments placed one against the other with an aluminum-magnesium alloy to obtain a vulcanizing mold which is in turn subsequently divided into individual profile segments,
   wherein the plasma coating provides a surface profile of 5-50 μm to a vulcanized tire produced by the segmented casting-vulcanizing mold comprising the profile segment.

2. The method of claim 1, wherein the plasma coating provides a surface profile of 7.5-25 μm to a vulcanized tire produced by the segmented casting-vulcanizing mold comprising the profile segment.

3. The method of claim 1, wherein the plasma coating is applied by applying a thermal sprayed layer.

4. The method of claim 1, wherein the flexible imprint is comprised of silicone rubber.

5. The method of claim 1, wherein the rigid casting made of plaster from the flexible imprint is comprised of silicone rubber.

6. The method of claim 1, wherein the plasma coating provides a surface profile of 10-15 μm to the vulcanized vehicle tire.

* * * * *